United States Patent
Fisher et al.

(10) Patent No.: US 10,330,187 B2
(45) Date of Patent: Jun. 25, 2019

(54) HYDRAULIC CONTROL UNIT FOR A LIMITED SLIP DIFFERENTIAL

(71) Applicant: Eaton Corporation, Cleveland, OH (US)

(72) Inventors: Daniel P. Fisher, Coldwater, MI (US); Andrew N. Edler, Homer, MI (US); Scott M. Besemer, Battle Creek, MI (US); Jeffrey A. Oesch, Roseville, MI (US); Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 276 days.

(21) Appl. No.: 15/290,679

(22) Filed: Oct. 11, 2016

(65) Prior Publication Data

US 2017/0045127 A1 Feb. 16, 2017

Related U.S. Application Data

(63) Continuation-in-part of application No. 29/549,910, filed on Dec. 29, 2015, now Pat. No. Des. 771,147,
(Continued)

(51) Int. Cl.
*F16H 57/037* (2012.01)
*F16H 48/32* (2012.01)
(Continued)

(52) U.S. Cl.
CPC ............ *F16H 48/32* (2013.01); *F15B 15/18* (2013.01); *F16H 57/025* (2013.01);
(Continued)

(58) Field of Classification Search
None
See application file for complete search history.

(56) References Cited

U.S. PATENT DOCUMENTS 2,239,866 A 4/1941 Vickers
2,853,091 A 9/1958 Tuer
(Continued)

FOREIGN PATENT DOCUMENTS

| CN | 101275659 A | 10/2008 |
|---|---|---|
| DE | 3524615 A1 | 1/1987 |
| EP | 0481022 B1 | 11/1995 |

OTHER PUBLICATIONS

International Search Report and Written Opinion for International Application No. PCT/US2015/025096 dated Jul. 21, 2015, 9 pages.
(Continued)

*Primary Examiner* — F Daniel Lopez
(74) *Attorney, Agent, or Firm* — RMCK Law Group PLC

(57) ABSTRACT

A hydraulic control unit that delivers hydraulic fluid to a limited slip differential includes a hydraulic control unit housing, a sump and a motor. The hydraulic control unit housing has an accumulator housing portion that houses a biasing assembly and a piston. The sump is defined in the hydraulic control unit housing and at least partially occupies a common space with the accumulator housing portion. The motor is configured to pump fluid into an accumulator chamber of the accumulator housing portion. The fluid pumped into the accumulator housing portion at least partially collapses the biasing assembly and introduces a precharge into the hydraulic control unit. The biasing assembly is configured to expand and urge the piston in a first direction resulting in fluid being communicated from the hydraulic control unit and into the limited slip differential.

23 Claims, 12 Drawing Sheets

Related U.S. Application Data and a continuation-in-part of application No. PCT/US2015/025096, filed on Apr. 9, 2015, which is a continuation-in-part of application No. 29/508,563, filed on Nov. 7, 2014.

(60) Provisional application No. 62/406,203, filed on Oct. 10, 2016, provisional application No. 62/298,746, filed on Feb. 23, 2016, provisional application No. 61/978,413, filed on Apr. 11, 2014.

(51) Int. Cl.
  *F16H 57/025* (2012.01)
  *F15B 15/18* (2006.01)
  *F15B 1/26* (2006.01)

(52) U.S. Cl.
  CPC .............. *F16H 57/037* (2013.01); *F15B 1/26* (2013.01); *F15B 2201/21* (2013.01); *F15B 2201/31* (2013.01); *F15B 2201/51* (2013.01)

(56) References Cited

U.S. PATENT DOCUMENTS

| | | |
|---|---|---|
| 2,917,898 A | 12/1959 | Berry |
| 4,479,395 A | 10/1984 | Riley |
| 4,738,595 A | 4/1988 | Gaiser |
| D308,209 S | 5/1990 | Laqua et al. |
| 5,827,145 A | 10/1998 | Okcuoglu |
| 7,418,887 B2 * | 9/2008 | Garlick ................ F16H 48/08 417/316 |
| 7,472,547 B2 | 1/2009 | Grosskopf et al. |
| 7,857,723 B2 | 12/2010 | Krisher |
| 7,891,730 B2 | 2/2011 | Rikkert |
| 7,985,162 B2 | 7/2011 | Buchele et al. |
| D741,916 S | 10/2015 | Fox |
| D744,542 S | 12/2015 | Edler et al. |
| D749,642 S | 2/2016 | Fisher et al. |
| 2002/0103053 A1 | 8/2002 | Thompson |
| 2003/0059310 A1 | 3/2003 | Koenig et al. |
| 2005/0167228 A1 | 8/2005 | Baxter |
| 2006/0283319 A1 | 12/2006 | Garlick |
| 2008/0042488 A1 | 2/2008 | Anderson |
| 2008/0060867 A1 | 3/2008 | Oda et al. |
| 2009/0138166 A1 | 5/2009 | Bruder |
| 2010/0218746 A1 | 9/2010 | Rabhi |
| 2011/0147111 A1 | 6/2011 | Sun et al. |
| 2012/0085451 A1 | 4/2012 | Poskie et al. |
| 2012/0329592 A1 | 12/2012 | Sun et al. |
| 2014/0179484 A1 | 6/2014 | Fox et al. |
| 2014/0274529 A1 | 9/2014 | Edler et al. |
| 2015/0105210 A1 | 4/2015 | Wadhva et al. |
| 2016/0076634 A1 | 3/2016 | Mitsubori et al. |
| 2016/0091077 A1 | 3/2016 | Sotani et al. |

OTHER PUBLICATIONS

European Search Report for Application No. EP15776679 dated Nov. 20, 2017, 6 pages.

* cited by examiner

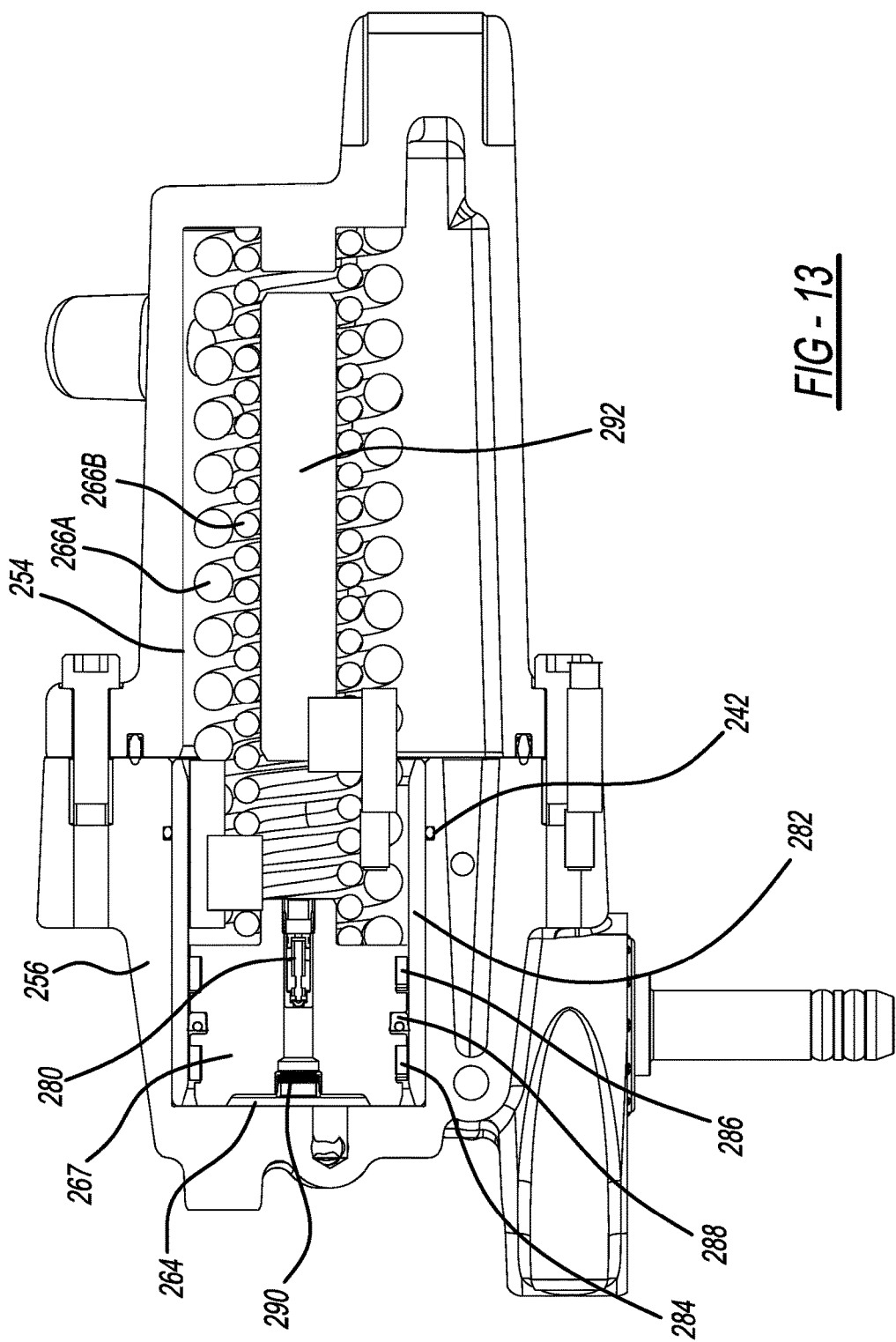

HYDRAULIC CONTROL UNIT FOR A LIMITED SLIP DIFFERENTIAL

CROSS-REFERENCE TO RELATED APPLICATIONS

This application is a continuation-in-part of International Application No. PCT/US2015/025096 filed on Apr. 9, 2015 which claims the benefit of U.S. Patent Application No. 61/978,413 filed on Apr. 11, 2014 and U.S. patent application Ser. No. 29/508,563 filed on Nov. 7, 2014. This application claims the benefit of U.S. Patent Application No. 62/298,746 filed on Feb. 23, 2016; U.S. patent application Ser. No. 29/549,910 filed on Dec. 29, 2015; and U.S. Patent Application No. 62/406,203 filed on Oct. 10, 2016. The disclosures of the above applications are incorporated herein by reference.

FIELD

The present disclosure relates generally to limited slip differentials and more particularly to a hydraulic control unit that delivers hydraulic fluid to a limited slip differential.

BACKGROUND

Differentials are provided on vehicles to permit an outer drive wheel to rotate faster than an inner drive wheel during cornering as both drive wheels continue to receive power from the engine. While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials were developed to shift power from the drive wheel that has lost traction and is spinning to the drive wheel that is not spinning.

Electronically-controlled, limited-slip differentials can include a hydraulically-actuated clutch to limit differential rotation between output shafts of the differential. In some configurations a hydraulic delivery device may be located remote from the differential. In some examples it is challenging to mount the hydraulic delivery device relative to the differential and/or housing that accepts the differential. Further, it can be challenging to connect the hydraulic coupling between the hydraulic delivery device and the limited-slip differential.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A hydraulic control unit that delivers hydraulic fluid to a limited slip differential includes a hydraulic control unit housing, a sump and a motor. The hydraulic control unit housing has an accumulator housing portion that houses a biasing assembly and a piston. The accumulator housing portion forms an accumulator chamber with the piston. The sump is defined in the hydraulic control unit housing and at least partially occupies a common space with the accumulator housing portion. The motor is configured to pump fluid into the accumulator chamber of the accumulator housing portion. The fluid pumped into the accumulator housing portion at least partially collapses the biasing assembly and introduces a pre-charge into the hydraulic control unit. The biasing assembly is configured to expand and urge the piston in a first direction resulting in fluid being communicated from the hydraulic control unit and into the limited slip differential.

According to additional features the hydraulic control unit housing further includes a hydraulic control unit housing mounting structure having first and second receiving bores that both define a first diameter. A first pair of first fasteners that both define a second diameter, less than the first diameter, couple the hydraulic control unit to an axle housing that houses the limited slip differential. A hydraulic coupling can have a first end that is received by a first receiving bore defined on the hydraulic control unit housing. The hydraulic coupling can have a second end that is configured to be received by a second receiving bore defined on a hydraulic port associated with the limited slip differential. At least one o-ring can be disposed around the second end that sealingly engages the second receiving bore. The hydraulic coupling can be configured to extend through a hydraulic coupler receiving bore define in the axle housing.

According to other features, the axle housing can define an inner diameter that is greater than an outer diameter of the hydraulic coupling. The hydraulic coupling is permitted to locate at a plurality of positions relative to the inner diameter of the axle housing during assembly of the hydraulic control unit to the limited slip differential to accommodate a corresponding plurality of positions of the differential relative to the axle housing. First and second mounting members can respectively comprise (i) third and fourth receiving bores, and (ii) first and second mounting passages. A second pair of first fasteners can respectively extend through the third and fourth receiving bores coupling the hydraulic control unit to the axle housing.

According to still other features, a pair of second fasteners can extend through the first and second mounting passages and mate with the hydraulic control unit housing to couple the first and second mounting members thereat. The hydraulic control unit can be pre-filled with hydraulic fluid prior to coupling to the axle housing. The biasing assembly can further comprise a first biasing member having a first spring rate and a second biasing member having a second spring rate. The first and second spring rates can be distinct.

A hydraulic control unit that delivers hydraulic fluid to a limited slip differential and constructed in accordance to another example of the present disclosure includes a hydraulic control unit housing, a sump, a motor and a hydraulic coupling. The hydraulic control unit housing can have an accumulator housing portion that houses a biasing assembly and a piston. The accumulator housing portion forms an accumulator chamber with the piston. The sump can be defined in the hydraulic control unit housing. The sump can at least partially occupy a common space with the accumulator housing portion. The motor can be configured to pump fluid into the accumulator chamber of the accumulator housing portion. The hydraulic coupling can have (i) a first end that is received by a first receiving bore defined on the hydraulic control unit housing, and (ii) a second end that is configured to be received by a second receiving bore defined on the hydraulic port associated with the limited slip differential. The fluid pumped into the accumulator chamber of the accumulator housing portion at least partially collapses the biasing assembly and introduces a pre-charge into the hydraulic control unit. The biasing assembly is configured to expand and urge the piston in a first direction resulting in fluid being communicated from the hydraulic control unit and into the limited slip differential.

According to additional features, at least one o-ring can be disposed around the second end that sealingly engages the second receiving bore. The hydraulic coupling can be configured to extend through a hydraulic coupler receiving bore defined in the axle housing. The axle housing can define an inner diameter that is greater than an outer diameter of the hydraulic coupling. The hydraulic coupling is permitted to locate at a plurality of positions relative to the inner diameter of the axle housing during assembly of the hydraulic control unit to the limited slip differential to accommodate a corresponding plurality of positions of the differential relative to the axle housing.

According to other features, the hydraulic control unit housing can further include a hydraulic control unit housing mounting structure having first and second receiving bores that both define a first diameter. A first pair of first fasteners that both define a second diameter, less than the first diameter, couple the hydraulic control unit to an axle housing that houses the limited slip differential. First and second mounting members can respectively comprise (i) third and fourth receiving bores, and (ii) first and second mounting passages. A second pair of first fasteners, respectively, extend through the third and fourth receiving bores coupling the hydraulic control unit to the axle housing. The third receiving bore is transverse to the first mounting passage. The fourth receiving bore is transverse to the second mounting passage.

According to other features, a pair of second fasteners can extend through the first and second mounting passages and mate with the hydraulic control unit housing to couple the first and second mounting members thereat. The hydraulic control unit can be pre-filled with hydraulic fluid prior to coupling to the axle housing. The biasing assembly can further comprise a first biasing member having a first spring rate and a second biasing member having a second spring rate. The first and second spring rates can be distinct.

A hydraulic control unit that delivers hydraulic fluid to a limited slip differential and constructed in accordance to additional features of the present disclosure includes a hydraulic control unit housing, a vent hole, a first passageway and a second passageway. The hydraulic control unit housing has an accumulator housing portion that houses a biasing assembly and a piston. The accumulator housing portion forms an accumulator chamber with the piston. The vent hole is defined in the hydraulic control unit housing. The first passageway is defined in the hydraulic control unit housing that is coaxial with the vent hole. The second passageway is defined in the hydraulic control unit housing that intersects the vent hole and is oriented at a different angle than the first passageway. The vent hole is dual purpose permitting hydraulic fluid entry into the accumulator chamber through the second passageway while air permitted to escape the hydraulic control unit housing through the vent hole.

According to additional features the hydraulic control unit further comprises a vent insert disposed in the vent hole subsequent filling of the hydraulic fluid. A motor is configured to pump fluid into the accumulator chamber of the accumulator housing portion. The biasing assembly further comprises a first biasing member having a first spring rate and a second biasing member having a second spring rate. The first and second spring rates are distinct. A guide rod can support the first and second biasing members. A sleeve can be positioned between the piston and the accumulator housing portion. The sleeve can be formed of a dissimilar material than at least one of the piston and the accumulator housing portion. The piston further comprises a first and second wear ring disposed on opposite ends of a seal. The wear rings are configured to minimize the tendency of the piston to move off axis. The piston can further comprise a pressure relief valve that is configured to release fluid from the accumulator housing in the event of an over-pressure event.

A method of filling a hydraulic control unit that delivers hydraulic fluid to a limited slip differential with hydraulic fluid. A hydraulic control unit is provided having an accumulator housing portion that houses a biasing assembly and a piston. The accumulator housing portion forms an accumulator chamber with the piston. The hydraulic control unit defines a vent hole and a first passageway. A filling needle is inserted into an opening of the vent hole. The needle is advanced along a second passageway. The second passageway intersects the opening. The second passageway is oriented at a different angle relative to the first passageway. Fluid is passed from the needle and into the accumulator housing while air within the hydraulic control unit escapes through the opening of the vent hole. The filling needle is withdrawn from the vent hole. A vent insert is inserted into the vent hole subsequent to withdrawing the filing needle from the vent hole.

BRIEF DESCRIPTION OF THE DRAWINGS

The present disclosure will become more fully understood from the detailed description and the accompanying drawings, wherein:

FIG. 13 is a cross-sectional view of the hydraulic control unit take along lines 13-13 of FIG. 9.

DETAILED DESCRIPTION

Figure 1:
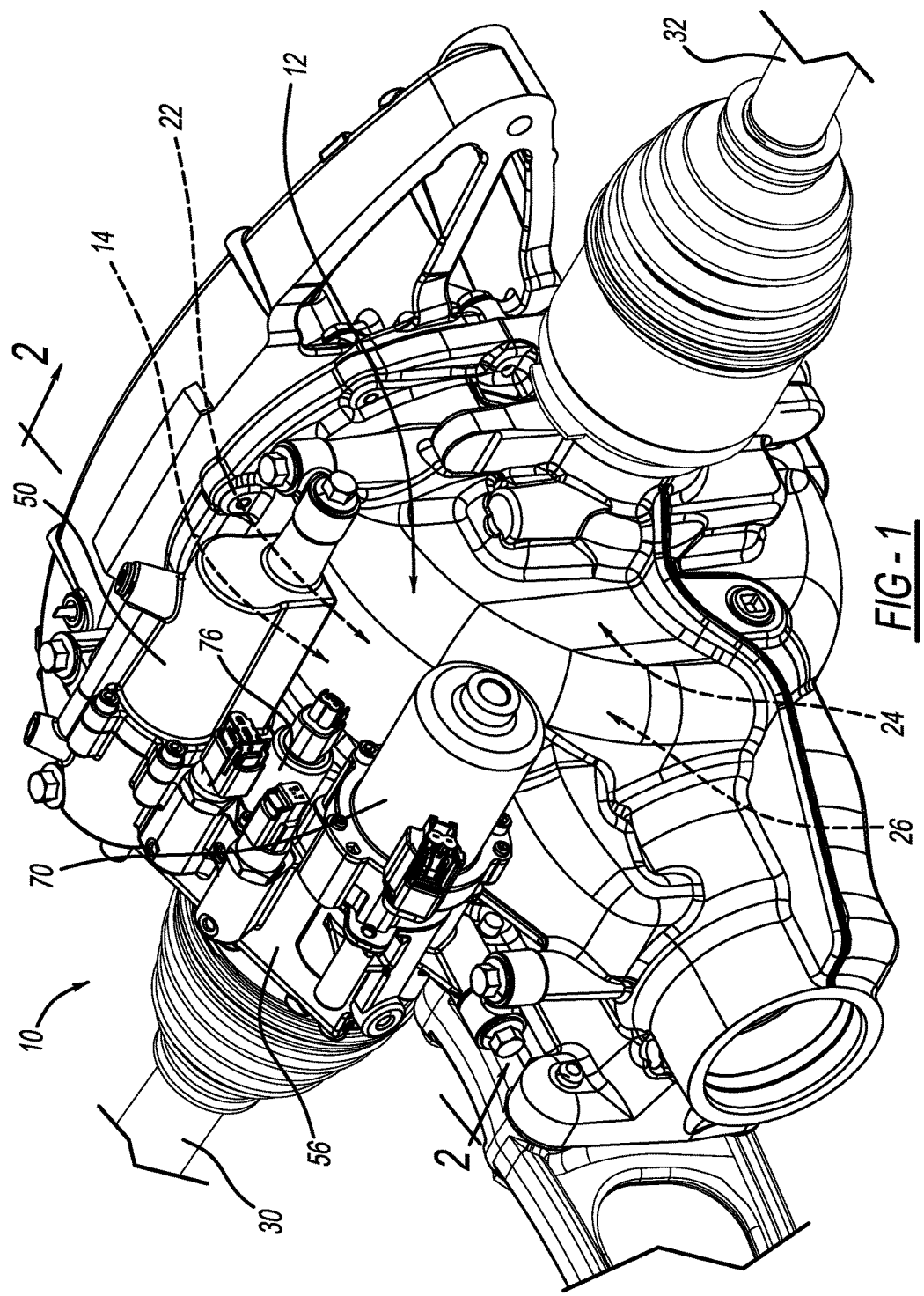
FIG. 1 is a front perspective view of a hydraulic control unit constructed in accordance to one example of the present disclosure and shown assembled onto an axle housing.
Figure 2:
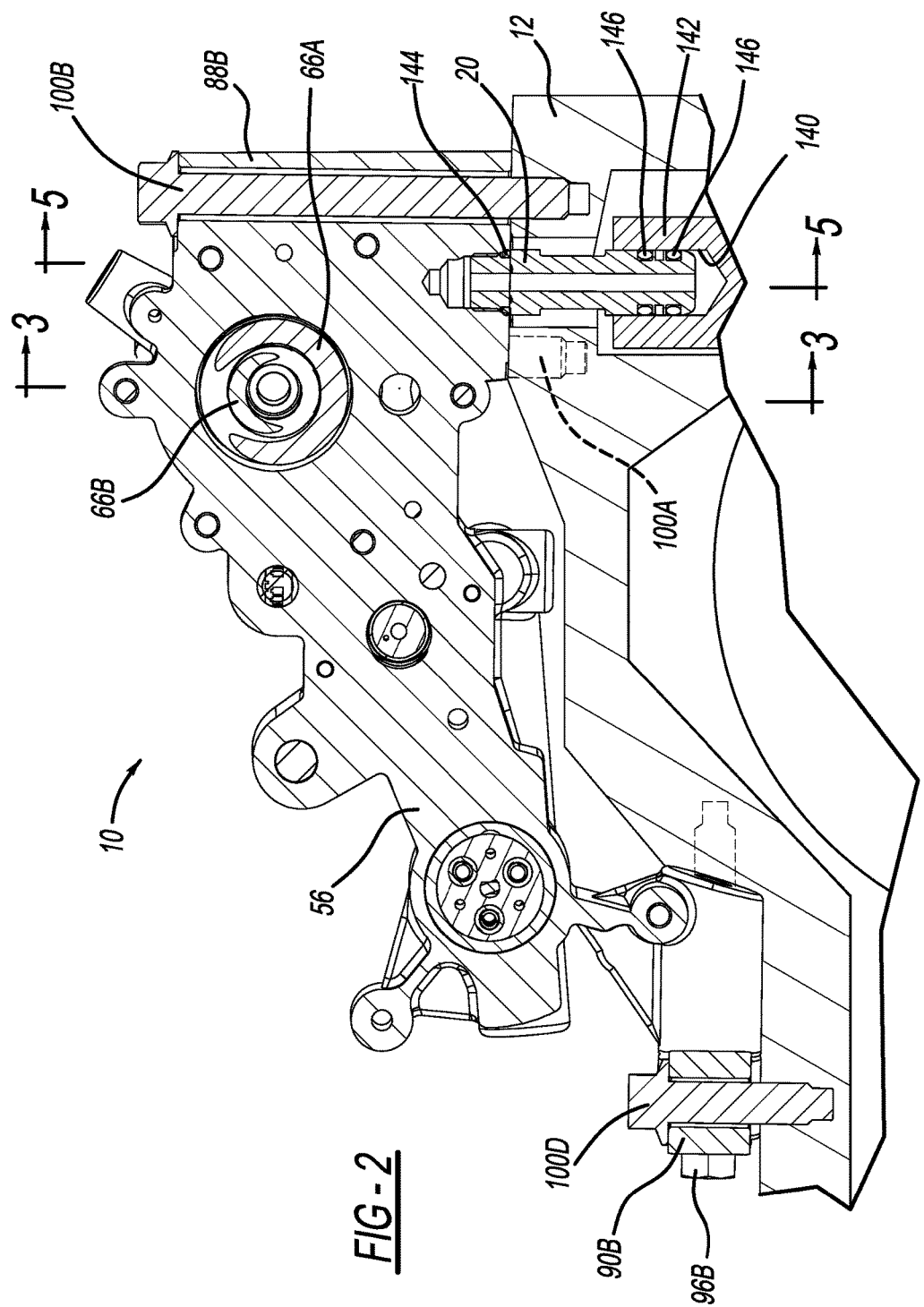
FIG. 2 is a cross-sectional view of the hydraulic control unit of FIG. 1 taken along lines 2-2.
Figure 5:
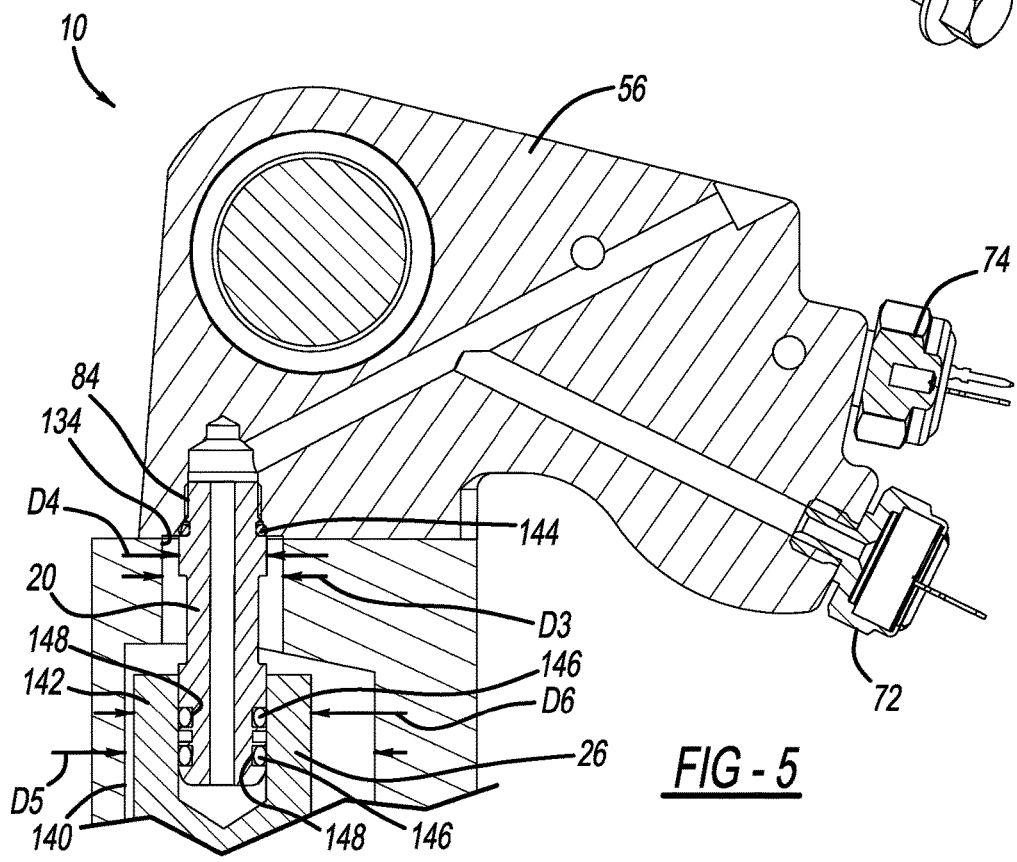
FIG. 5 is a cross-sectional view of the hydraulic control taken along lines 5-5 of FIG. 2 and taken at a high pressure port illustrating an anti-rotation component.

With initial reference to FIG. 1, a hydraulic control unit constructed in accordance to one example of the present disclosure is shown and generally identified with reference numeral 10. As will become appreciated herein, the hydraulic control unit 10 according to the present disclosure provides a single unit that can be mounted against or relative to an axle housing 12. The configuration allows for simple assembly and setup. In general, the hydraulic control unit 10 can deliver hydraulic fluid to a limited slip differential 14 housed in the axle housing 12 through a hydraulic coupling 20 (FIG. 5). The limited slip differential 14 can be an electronic limited slip differential having a clutch 22 and a piston (not specifically shown).

The limited slip differential 14 can operate to drive a pair of axle shafts 30, 32 that are connected to a pair of respective drive wheels (not shown). In general, the limited slip differential 14 functions as a traditional open differential during normal operating conditions until an event occurs where a bias torque is required. When a loss in traction is detected or anticipated, the clutch 22 can be selectively actuated in order to generate the optimum bias ratio for the situation.

The limited slip differential 14 can further include a differential gear assembly 24 configured in a differential case 26 that acts to allow the axle shafts 30, 32 to rotate at different speeds. The differential gear assembly 24 can include a pair of side gears (not specifically shown) that are mounted for rotation with the axle shafts 30 and 32 (and the drive wheels). In an open configuration, described below, the differential gear assembly acts to allow the axle shafts 30 and 32 to rotate at different speeds.

The clutch 22 couples a drive shaft output with the differential gear assembly 24. The clutch 22 can include a clutch pack (not specifically shown) that has a plurality of annular plates interleaved between a plurality of annular friction disks. The plurality of annular plates and annular friction disks are interleaved between one another and act to rotate past one another in substantially non-contacting relationship when the clutch 22 is in its open position. However, it will be appreciated by those skilled in the art that the term "non-contacting" as used herein is relative and is not meant to necessarily indicate that the annular plates and annular friction disks have absolutely no contact when the clutch 22 is in the open condition. The annular plates and annular friction disks are axially movable into frictional engagement relative to one another, thereby reducing relative rotation between the annular plates and annular friction disks when the clutch 22 is in the closed or partially closed configurations. In this manner, when the clutch 22 is in its closed position, the side gears, as well as the axle shafts and the drive wheels rotate together.

The clutch 22 can operate in an open configuration to allow the side gears to rotate independently from each other, e.g., at different speeds. The clutch 22 can also operate in a closed or partially closed configuration where the side gears rotate together or partially together (that is, not independently), e.g., at substantially the same speed. The clutch 22 is a hydraulic clutch that utilizes pressurized hydraulic fluid provided through the hydraulic fluid coupling 20 from the hydraulic control unit 10 to act on the piston to selectively actuate the clutch pack between the open, closed and partially closed configurations. It will be appreciated that the limited slip differential 14 described above is merely exemplary. In this regard, the hydraulic control unit 10 can be used to deliver hydraulic fluid to an actuator (piston, etc.) of any limited slip differential configuration.

with general reference now to FIGS. 1-7, the hydraulic control unit 10 will be described in greater detail. The hydraulic control unit 10 can generally include a hydraulic control unit housing 50 having an accumulator housing portion 54 and a housing manifold portion 56. The housing manifold portion 56 can define an accumulator chamber 64 with the piston 67. The accumulator housing portion 54 and the housing manifold portion 56 houses first and second biasing members 66A, 66B and a piston 67. The first and second biasing members 66A and 66B can be collectively referred to herein as a biasing assembly 68. The first biasing member 66A has a first spring rate while the second biasing member 66B has a second spring rate. The first and second spring rates cooperate together to provide a desired spring rate for the biasing assembly 68. As will become appreciated herein, fluid is pumped behind the piston 67 into the accumulator chamber 64 to cause the piston 67 to translate toward the first and second biasing members 66A, 66B.

Figure 3:
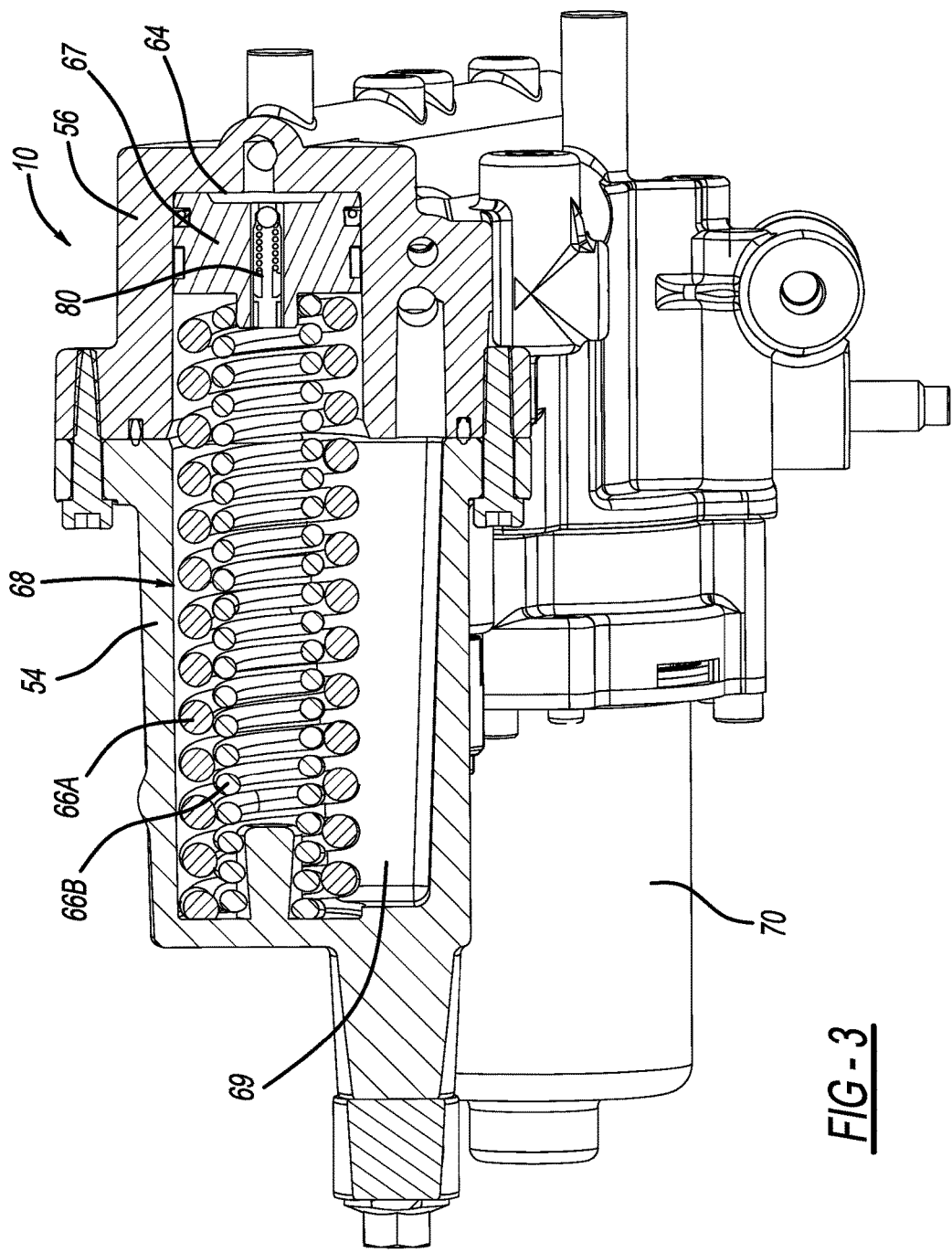
FIG. 3 is a cross-sectional view of the hydraulic control unit of FIG. 2 taken along lines 3-3.
Figure 4:
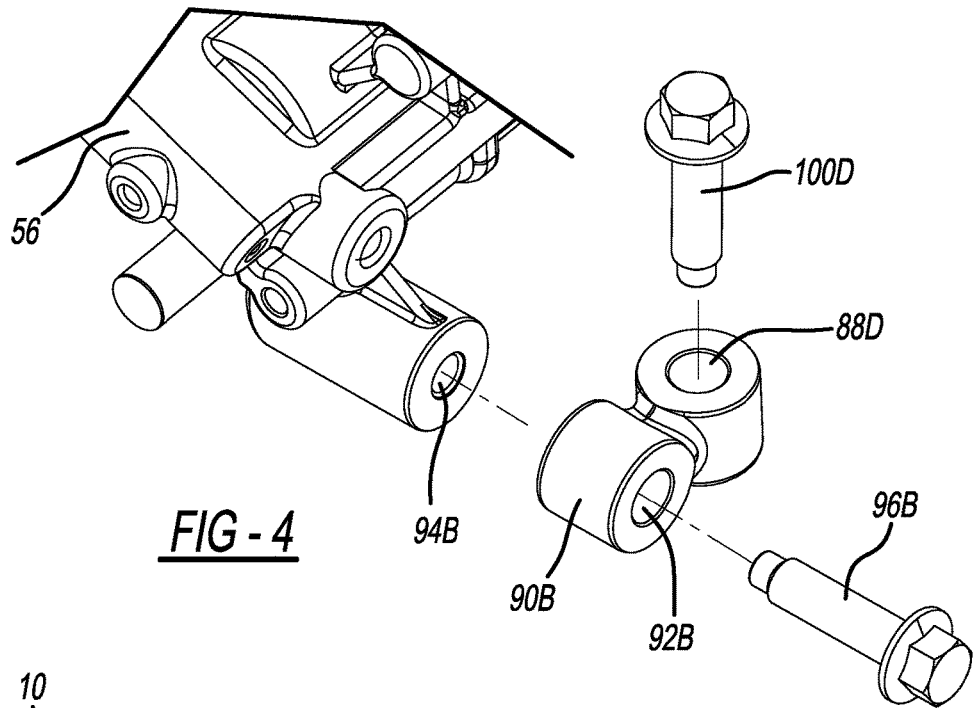
FIG. 4 is a detail view of an attachment area of the hydraulic control unit of FIG. 1.

In the hydraulic control unit 10 of the present disclosure, the accumulator chamber 64 houses the biasing members 66A, 66B and also provides a hydraulic sump 69 (FIG. 3). Such a configuration allows for reduced packaging space. The housing manifold portion 56 can define various fluid passages configured to provide access to various sensors disclosed herein. The hydraulic control unit 10 can also comprise a motor 70 can be coupled to the hydraulic control unit housing 50.

The hydraulic control unit 10 can further include a clutch piston pressure sensor 72 (FIG. 5), an accumulator pressure sensor 74 and a three-way proportional regulating valve 76. The clutch piston pressure sensor 72 can be threadably or otherwise securely received by the hydraulic control unit housing 50. The clutch piston pressure sensor 72 can be configured to measure a pressure at the piston of the limited slip differential 14. The accumulator pressure sensor 74 can be threadably or otherwise securely received by the hydraulic control unit housing 50. The accumulator pressure sensor 74 can be configured to measure a pressure in the accumulator chamber 64. The three-way proportional regulating valve 76 can be securely coupled to the hydraulic control unit housing 50. The three-way proportional regulating valve 76 can be configured to regulate fluid pressure within the unitary hydraulic control unit housing 50.

The motor 70 can operate a piston pump or gerotor gear assembly and can be conventionally constructed. The gerotor gear assembly can comprise an inner gerotor gear and an outer gerotor gear. The operation of the gerotor gear assembly can be conventional where relative rotation of the inner and outer gerotor gears can cause a pumping action on the fluid contained in the hydraulic control unit housing 50. In examples where a piston pump is used, the piston pump can cause a pumping action on the fluid contained in the hydraulic control unit housing 50. The pumping action ultimately causes the fluid to be pumped into the accumulator chamber 64 (that shares a common space with the sump 69). The pumping action ultimately causes the fluid to be pumped into the accumulator chamber 64. In doing so, the biasing members 66A, 66B at least partially collapse and introduces a pre-charge into the system. In this regard, the motor 70 is not required to run constantly. The fluid pressure can be introduced into the limited slip differential 12 by the biasing members 66A, 66B acting on the piston 67. A pressure relief valve 80 can be provided in the piston 67. The pressure relief valve 80 can protect the system by releasing fluid in the event of an over pressure malfunction.

With specific reference now to FIGS. 4-7, additional features of the hydraulic control unit housing 50 will be described. The hydraulic control unit housing 50 can define a receiving bore 84 (FIG. 5) that is configured to receive the hydraulic coupling 20. The hydraulic control unit housing 50 can include a hydraulic control unit housing mounting structure collectively identified at reference numeral 86. The hydraulic control unit housing mounting structure 86 can generally include a first, second, third and fourth receiving bores 88A, 88B, 88C and 88D. The first, second, third and fourth receiving bores 88A, 88B, 88C and 88D can define a first diameter D1 (FIG. 7). In the example shown, the third and fourth receiving bores 88C and 88D can be formed on mounting members 90A and 90B, respectively. The mounting members 90A and 90B can define mounting passages 92A and 92B, respectively that are configured in an orientation generally transverse to the receiving bores 88C and 88D. The mounting passages 92A and 92B can align with connecting bores 94A and 94B formed in the housing manifold portion 56.

First fasteners 96A and 96B can extend through the mounting passages 92A and 92B and threadably mate with the connecting bores 94A and 94B. The first fasteners 96A and 96B couple the mounting members 90A and 90B to the housing manifold portion 56. Second fasteners 100A, 100B, 100C and 100D can extend through the receiving bores 88A, 88B, 88C and 88D. The second fasteners 100A, 100B, 100C and 100D can have an outer diameter D2 (FIG. 7). The outer diameter D2 is less than the first diameter D1 to allow for misalignment during assembly as will become appreciated herein.

Figure 6:
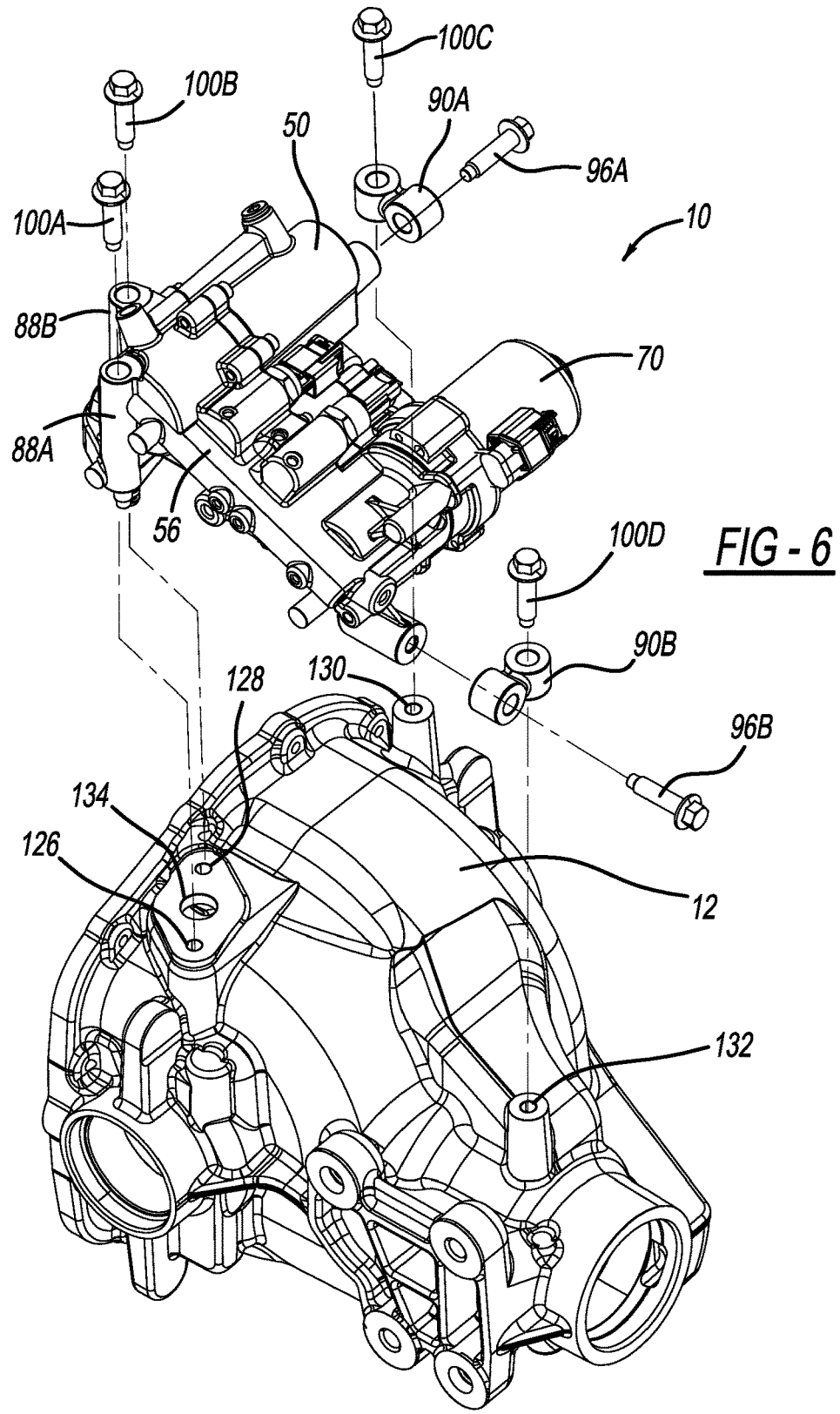
FIG. 6 is an exploded perspective view of the hydraulic control unit and the axle housing.
Figure 7:
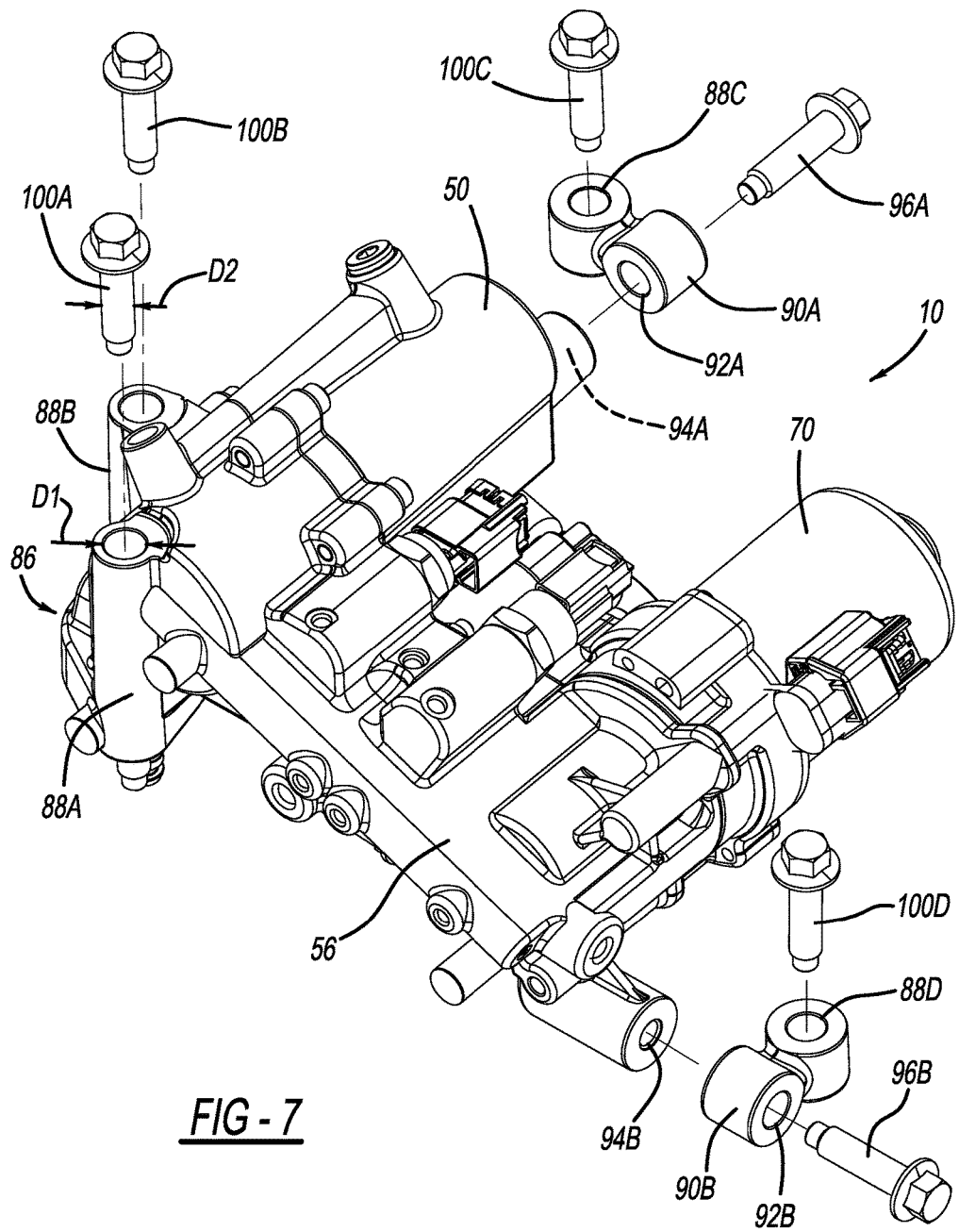
FIG. 7 is a front perspective view of the hydraulic control unit of FIG. 1 and shown with various fasteners exploded for illustration.

With particular reference to FIG. 6, the axle housing 12 defines a first mounting bore 126, a second mounting bore 128, a third mounting bore 130, a fourth mounting bore 132 and a hydraulic coupling receiving bore 134. In general, the hydraulic coupling receiving bore 134 is configured to accept the hydraulic coupling 20. In the example shown, the hydraulic coupling receiving bore 134 defines a diameter D3 that is larger than a diameter D4 of the hydraulic coupling 20 to allow the hydraulic coupling 20 to suitably locate onto a receiving bore 140 defined on a hydraulic port 142 provided by the differential case 26. Further, as described below, the differential case 26 may move within the axle housing 12 during shimming. In this regard an inner diameter D5 defined on the axle housing 12 is larger than an outer diameter D6 of a hydraulic port 142 extending from the differential case 26. In this regard, the hydraulic control unit 10 will self-locate into the hydraulic coupling receiving bore 134 and the receiving bore 140. The second fastener 100A can threadably mate with the first mounting bore 126. The second fastener 100B can threadably mate with the second mounting bore 128. The third fastener 100C can threadably mate with the third mounting bore 130. The third fastener 100D can threadably mate with the fourth mounting bore 132.

During assembly of the differential assembly 14 into the axle housing 12, the limited slip differential 14 is shimmed relative to the axle housing 12 to account for a predetermined amount of backlash. During shimming, the limited slip differential 14 may more left or right (toward and away from the axle shafts 30 and 32). In this regard, the location of the receiving bore 140 defined on the hydraulic port 142 may not always be in the same location. The dimension of the hydraulic coupling receiving bore 134 (inner diameter D3) allows the hydraulic coupling 20 to properly align for receipt into the receiving bore 140 while still being connected to the hydraulic control unit housing 50. The hydraulic coupling 20 is permitted to locate at a plurality of positions relative to the inner diameter D3 of the axle housing 12 during assembly of the hydraulic control unit 10 to the limited slip differential 26 to accommodate a corresponding plurality of positions of the differential 26 relative to the axle housing 12. A first o-ring 144 can sealingly locate between the hydraulic coupling 20 and the housing manifold portion 56. The hydraulic coupling can further include second o-rings 146 received in grooves 148. The second o-rings 146 sealingly engage the receiving bore 140.

Once the hydraulic coupler 20 is suitably received by the hydraulic port 142, and acceptable alignment is attained, the second fasteners 100A and 100B can be tightened to a fixed position with the first and second mounting bores 126 and 128 of the axle housing 12. Notably, the receiving bores 88A and 88B have a greater diameter than the second fasteners 100A and 100B allowing for lateral movement of the housing manifold portion 56 relative to the axle housing 12 prior to tightening the second fasteners 100A and 100B into the respective first and second mounting bores 126 and 128. The second fasteners 100C and 100D can then be tightened into the third and fourth mounting bores 130 and 132. The 88C and 88D can have a greater diameter than the second fasteners 100C and 100D to allow for misalignment resulting from the first and second fasteners 100A and 100B fixing the housing manifold portion 56 relative to the axle housing 12.

The hydraulic coupling 20 can provide anti-rotation properties that inhibit rotation of the hydraulic coupling 20 around its axis in the installed position. In one configuration, the hydraulic control unit 10 may be pre-filled with hydraulic fluid prior to coupling to the axle housing 12. A seal (not specifically shown) may be implemented at an interface between the hydraulic coupling 20 and the hydraulic coupling receiving bore 134 and/or the receiving bore 140. Such seal may be punctured during the act of locating the hydraulic coupling 20 into the hydraulic coupling receiving bore 134 and/or the receiving bore 140.

With reference now to FIGS. 8-13, a hydraulic control unit constructed in accordance to another example of the present disclosure is shown and generally identified with reference numeral 210. The hydraulic control unit 210 provides a single unit that can be mounted against or relative to the axle housing 12. The hydraulic control unit can deliver hydraulic fluid to a limited slip differential 114 housed in the axle housing 12 through the hydraulic coupling 20 (see also FIG. 5).

The hydraulic control unit 210 can generally include a hydraulic control unit housing 250 having an accumulator housing portion 254 and a housing manifold portion 256. The housing manifold portion 256 can define an accumulator chamber 264 with the piston 267. The accumulator housing portion 254 and the housing manifold portion 256 houses first and second biasing members 266A and 266B and the piston 267. The first and second biasing members 266A and 266B can be collectively referred to herein as a biasing assembly 268. The first biasing member 266A has a first spring rate while the second biasing member 266B has a second spring rate. The first and second spring rates cooperate together to provide a desired spring rate for the biasing assembly 268. As will become appreciated herein, fluid is pumped behind the piston 267 into the accumulator chamber 264 to cause the piston 267 to translate toward the first and second biasing members 266A, 266B.

In the hydraulic control unit 210 of the present disclosure, the accumulator chamber 264 houses the biasing members 266A, 266B and also provides a hydraulic sump 269 (FIG. 3). Such a configuration allows for reduced packaging space. The housing manifold portion 256 can define various fluid passages configured to provide access to various sensors disclosed herein. The hydraulic control unit 210 can also comprise a motor 270 that can be coupled to the hydraulic control unit housing 250.

The hydraulic control unit 210 can further include a clutch piston pressure sensor, an accumulator pressure sensor and a three-way proportional regulating valve. The clutch piston pressure sensor can be threadably or otherwise securely received by the hydraulic control unit housing 250. The clutch piston pressure sensor can be configured to measure a pressure at the piston of the limited slip differential. The accumulator pressure sensor can be threadably or otherwise securely received by the hydraulic control unit housing 250. The accumulator pressure sensor can be configured to measure a pressure in the accumulator chamber 264. The three-way proportional regulating valve can be securely coupled to the hydraulic control unit housing 250. The three-way proportional regulating valve can be configured to regulate fluid pressure within the unitary hydraulic control unit housing 250.

The motor 270 can operate a piston pump or gerotor gear assembly and can be conventionally constructed. The gerotor gear assembly can comprise an inner gerotor gear and an outer gerotor gear. The operation of the gerotor gear assembly can be conventional where relative rotation of the inner and outer gerotor gears can cause a pumping action on the fluid contained in the hydraulic control unit housing 250. In examples where a piston pump is used, the piston pump can cause a pumping action on the fluid contained in the hydraulic control unit housing 250. The pumping action ultimately causes the fluid to be pumped into the accumulator chamber 264 (that shares a common space with the sump 269). The pumping action ultimately causes the fluid to be pumped into the accumulator chamber 264. In doing so, the biasing members 266A, 266B at least partially collapse and introduces a pre-charge into the system. In this regard, the motor 270 is not required to run constantly. The fluid pressure can be introduced into the limited slip differential by the biasing members 266A, 266B acting on the piston 267. A pressure relief valve 280 can be provided in the piston 267. The pressure relief valve 280 can protect the system by releasing fluid in the event of an over pressure malfunction.

A sleeve 282 is positioned between the accumulator housing portion 254 and the piston 267. In one example the sleeve 282 can be formed of a dissimilar material than the accumulator housing portion 254 and the piston 267. For example, the sleeve 282 can be formed of steel while the accumulator housing portion 254 and piston 267 are formed of aluminum. Because the sleeve 282 is formed of a different material, it can facilitate smoother slidable operation of the piston 267 within the accumulator housing portion 254. An o-ring 284 can sealingly located between the accumulator housing portion 254 and the sleeve 282.

The piston 267 can have wear rings 284 and 286 positioned on opposite ends of a seal member 288. The wear rings 284 and 286 can minimize the tendency of the piston 267 from cocking or moving off axis during translation. A screen 290 is disposed on the piston 267 to keep large debris out of the accumulator housing portion 254. A guide rod 292 is located within the biasing members 266A, 266B to support and minimize buckling of the biasing members 266A, 266B.

Figure 10:
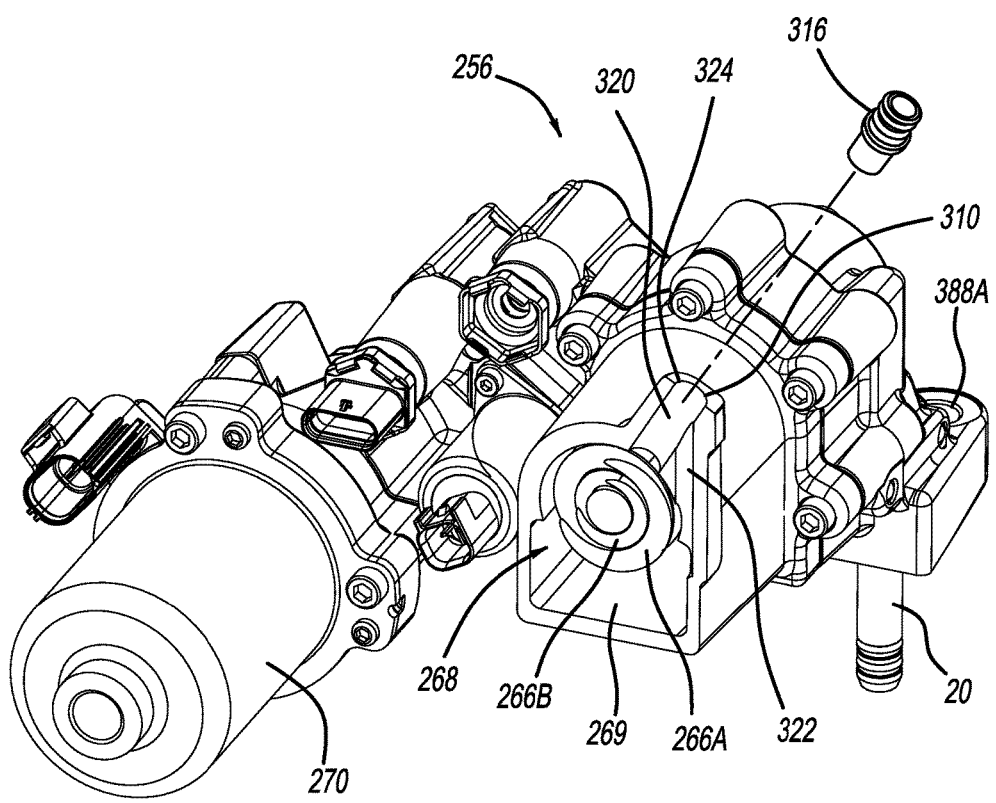
FIG. 10 is a cross-sectional view of the hydraulic control unit taken along lines 10-10 of FIG. 9 and shown with the fill port fitting exploded.
Figure 11:
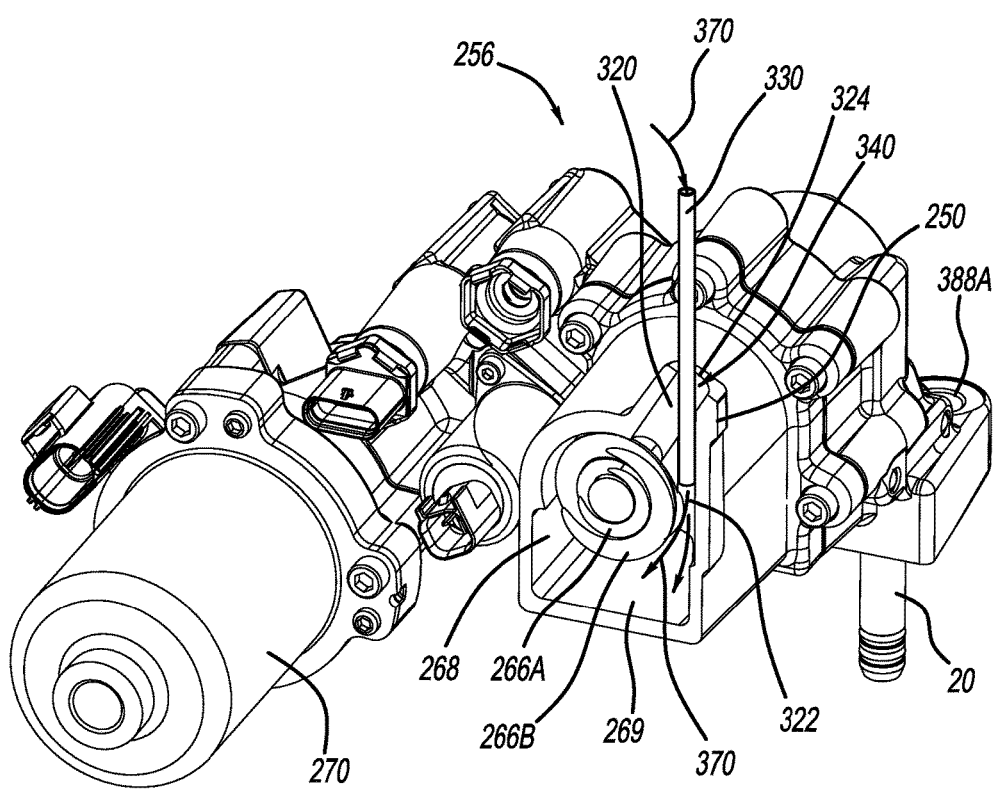
FIG. 11 is a close-up view of the fill port and shown with a filling needle inserted through a second passageway of the hydraulic control unit housing during a filling event.
Figure 12:
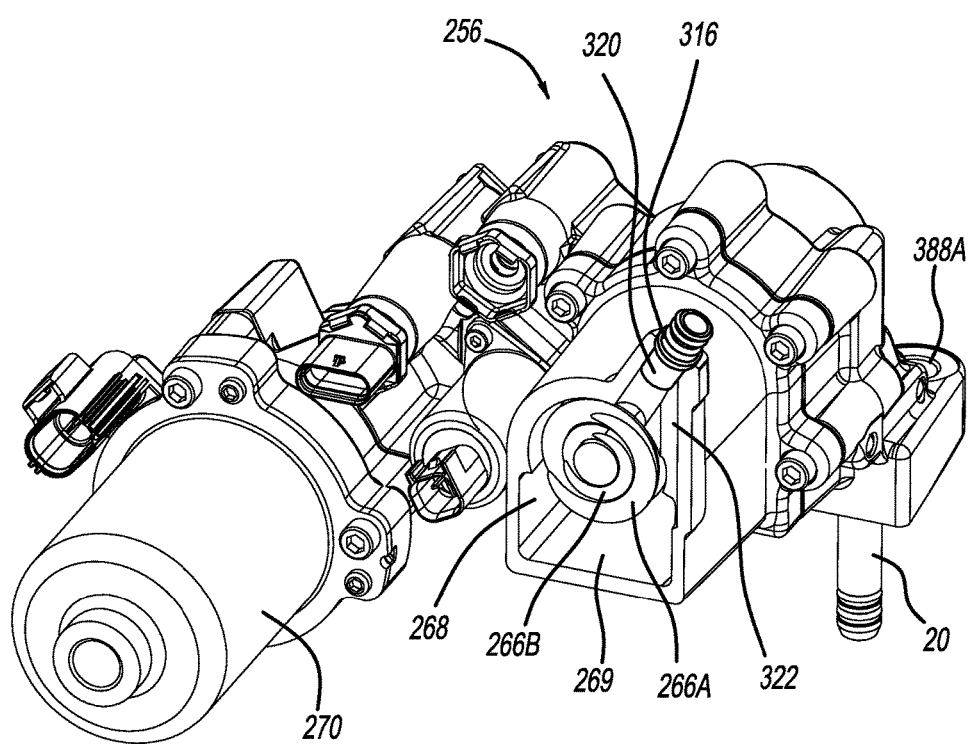
FIG. 12 is a cross-sectional view of the hydraulic control unit taken along lines 10-10 of FIG. 9 and shown with the fill port fitting installed.

With particular reference now to FIGS. 10 and 11 additional features of the hydraulic control unit housing 250 will be described. The hydraulic control unit housing 250 is configured to allow for easy filling of hydraulic fluid. Specifically, hydraulic fluid can be filled through a fill port or vent hole 310 defined in the hydraulic control unit housing 250. As will become appreciated, the vent hole 310 is dual purpose in that it permits fluid entry into the accumulator chamber 264 and also serves as a vent for passage of air. Once the hydraulic control unit housing 250 has been sufficiently filled with fluid, a vent insert 316 can be inserted, such as by way of press-fit, into the vent hole 310. The configuration of the hydraulic control unit housing 250 allows fluid to be injected quickly into the accumulator chamber 264 without splash back. In some examples the hydraulic control unit housing 250 can be filled within a few seconds.

The hydraulic control unit housing 250 includes a first passageway 320 that is generally coaxial with the vent hole 310. The hydraulic control unit 250 further includes a second passageway 322 that may intersect an opening or bypass fill port 324 of the vent hole 310, but which is oriented at a different angle than the first passageway 320. The second passageway 322 serves as the bypass fill port 324. In this regard, a filling needle 330 (FIG. 11) may be inserted into the opening 324 and along the second passageway 322. Fluid 370 may be deployed from the filling needle 330 and into the accumulator chamber 264 while air is permitted to escape the accumulator chamber 264 through an annular space 340 at the opening 324 around the outside of the filing needle 330.

Figure 8:
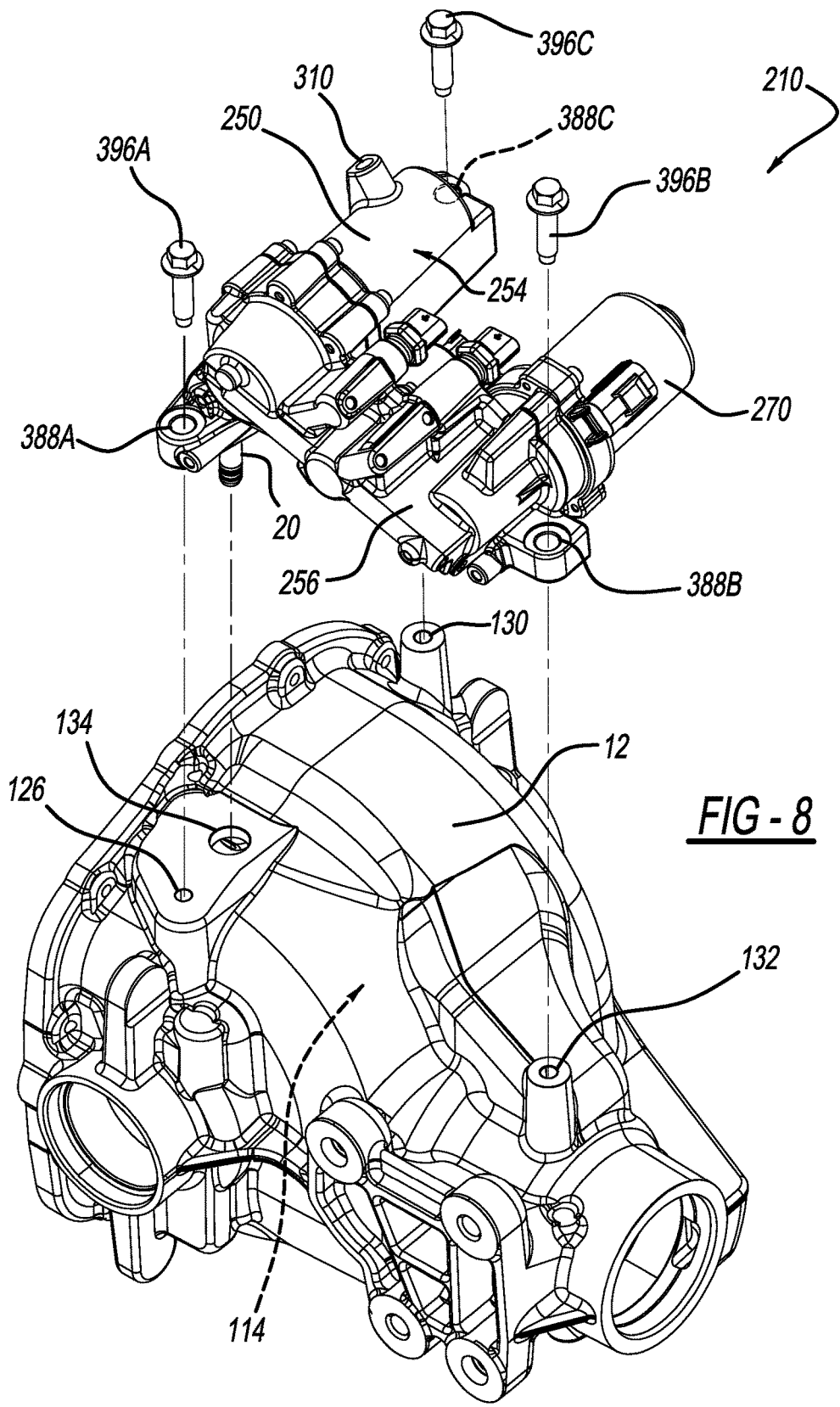
FIG. 8 is an exploded perspective view of a hydraulic control unit constructed in accordance to another example of the present disclosure and shown with the axle housing.
Figure 9:
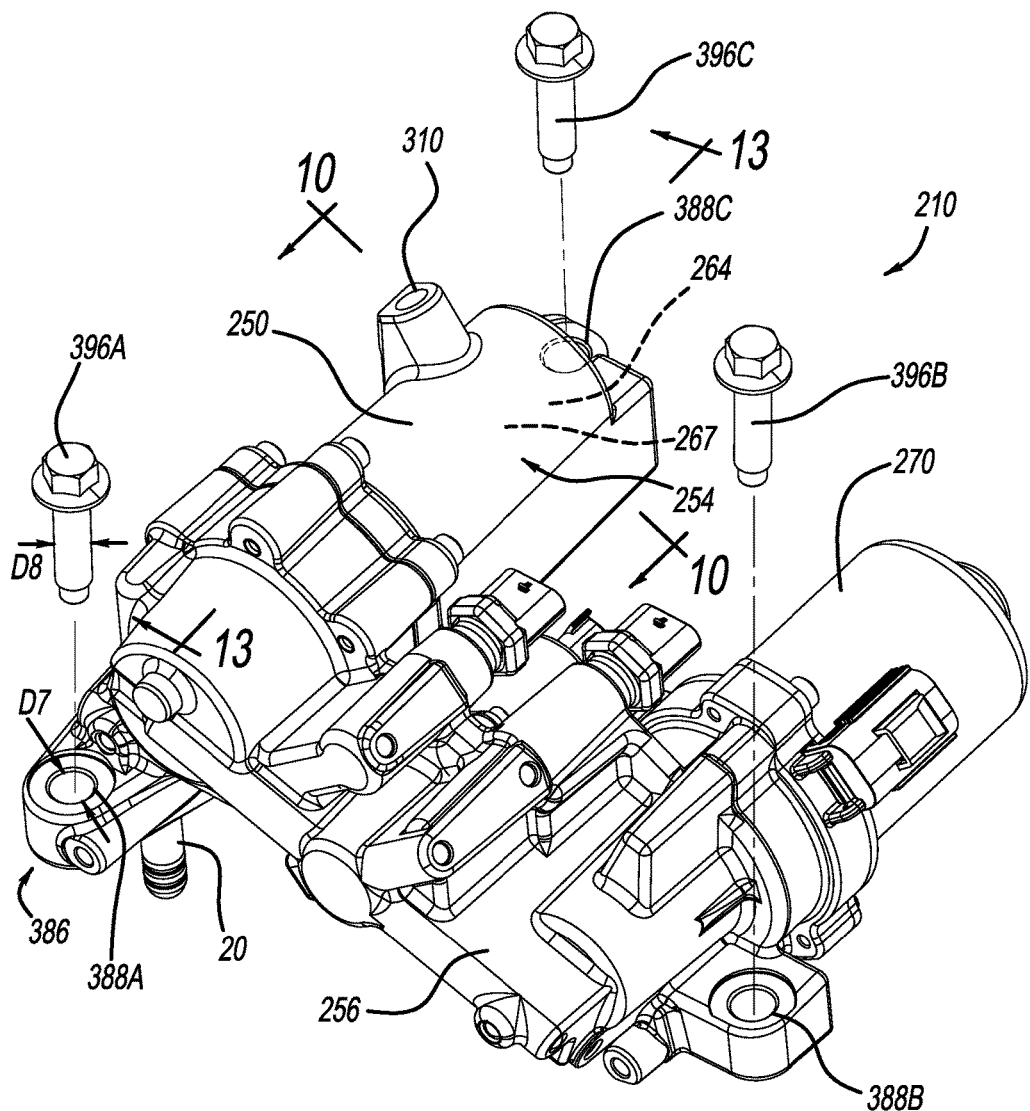
FIG. 9 is a front perspective view of the hydraulic control unit of FIG. 8 and shown with various fasteners exploded for illustration.

With specific reference now to FIGS. 8 and 9, additional features of the hydraulic control unit housing 250 will be described. The hydraulic control unit housing 250 can define a receiving bore (see 84, FIG. 5) that is configured to receive the hydraulic coupling 20. The hydraulic control unit housing 250 can include a hydraulic control unit housing mounting structure collectively identified at reference numeral 386. The hydraulic control unit housing mounting structure 386 can generally include a first, second and third receiving bores 388A, 388B and 388C. The first, second and third receiving bores 388A, 388B and 388C can define a diameter D7 (FIG. 9).

Fasteners 396A, 396B and 396C can extend through the first, second and third receiving bores 388A, 388B and 388C and threadably mate with the bores 126, 132 and 130 (FIG. 8), respectively. The fasteners 396A, 396B and 396C can have an outer diameter D8 (FIG. 9). The outer diameter D8 is less than the diameter D7 to allow for misalignment during assembly.

Once the hydraulic coupler 20 is suitably received by the hydraulic port (see 142, FIG. 2) and acceptable alignment is attained, the fasteners 396A, 396B and 396C can be tightened to a fixed position with the first and second mounting bores 126, 132 and 130 of the axle housing 12. Again, the receiving bores 388A, 388B and 388C have a greater diameter than the fasteners 396A, 396B and 396C allowing for lateral movement of the housing manifold portion 256 relative to the axle housing 12 prior to tightening the second fasteners 396A, 396B and 396C into the respective bores 388A, 388B and 388C.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A hydraulic control unit that delivers hydraulic fluid to a limited slip differential, the hydraulic control unit comprising:

a hydraulic control unit housing having an accumulator housing portion and a housing manifold portion that collectively house a biasing assembly and a piston, the housing manifold portion forming an accumulator chamber with the piston, wherein the biasing assembly further comprises:
   A first biasing member having a first spring rate;
   A second biasing member having a second spring rate, wherein the first and second spring rates are distinct; and
   A guide rod that supports the first and second biasing members and minimizes buckling thereof;
a sump defined in the hydraulic control unit housing and that at least partially occupies a common space with the accumulator housing portion; and
A pump that pumps fluid into the accumulator chamber of the accumulator housing portion;
wherein the fluid pumped into the accumulator housing portion at least partially collapses the biasing assembly and introduces a pre-charge into the hydraulic control unit, wherein the biasing assembly is configured to subsequently expand after the pre-charge and urge the piston in a first direction resulting in fluid being communicated from the hydraulic control unit and into the limited slip differential.

2. The hydraulic control unit of claim 1 wherein the hydraulic control unit housing further comprises:
   a hydraulic control unit housing mounting structure having first and second receiving bores that both define a first diameter and wherein a first pair of first fasteners that both define a second diameter, less than the first diameter, couple the hydraulic control unit to an axle housing that houses the limited slip differential.

3. The hydraulic control unit of claim 2, further comprising a hydraulic coupling that has a first end that is received by a first receiving bore defined on the hydraulic control unit housing.

4. The hydraulic control unit of claim 3 wherein the hydraulic coupling has a second end that is configured to be received by a second receiving bore defined on the limited slip differential.

5. The hydraulic control unit of claim 4, further comprising at least one o-ring disposed around the second end that sealingly engages the second receiving bore.

6. The hydraulic control unit of claim 5 wherein the hydraulic coupling is configured to extend through a hydraulic coupler receiving bore defined in the axle housing.

7. The hydraulic control unit of claim 6 wherein the axle housing defines an inner diameter that is greater than an outer diameter of the hydraulic coupling, wherein the hydraulic coupling is permitted to locate at a plurality of positions relative to the inner diameter of the axle housing during assembly of the hydraulic control unit to the limited slip differential to accommodate a corresponding plurality of positions of the differential relative to the axle housing.

8. The hydraulic control unit of claim 2, further comprising first and second mounting members that respectively comprise (i) third and fourth receiving bores, and (ii) first and second mounting passages, wherein a second pair of first fasteners respectively extend through the third and fourth receiving bores coupling the hydraulic control unit to the axle housing.

9. The hydraulic control unit of claim 8, further comprising a pair of second fasteners that extend through the first and second mounting passages and mate with the hydraulic control unit housing to couple the first and second mounting members thereat.

10. The hydraulic control unit of claim 2 wherein the hydraulic control unit is pre-filled with hydraulic fluid prior to coupling to the axle housing.

11. A hydraulic control unit that delivers hydraulic fluid to a limited slip differential, the hydraulic control unit comprising:
   a hydraulic control unit housing having an accumulator housing portion and a housing manifold portion that collectively house a biasing assembly and a piston, the housing manifold portion forming an accumulator chamber with the piston;
   a sump defined in the hydraulic control unit housing and that at least partially occupies a common space with the accumulator housing portion;
   a pump that pumps fluid into the accumulator chamber of the accumulator housing portion; and
   a hydraulic coupling that has (i) a first end that is received by a first receiving bore defined on the hydraulic control unit housing, and (ii) a second end that is configured to extend through a hydraulic coupler receiving bore define in the axle housing and be received by a second receiving bore defined on the limited slip differential, the second end having an o-ring disposed therearound that sealingly engages the second receiving bore;
   wherein the fluid pumped into the accumulator chamber of the accumulator housing portion at least partially collapses the biasing assembly and introduces a pre-charge into the hydraulic control unit, wherein the biasing assembly is configured to subsequently expand after the pre-charge and urge the piston in a first direction resulting in fluid being communicated from the hydraulic control unit and into the limited slip differential.

12. The hydraulic control unit of claim 11, further comprising at least one o-ring disposed around the second end that sealingly engages the second receiving bore.

13. The hydraulic control unit of claim 11 wherein the axle housing defines an inner diameter that is greater than an outer diameter of the hydraulic coupling, wherein the hydraulic coupling is permitted to locate at a plurality of positions relative to the inner diameter of the axle housing during assembly of the hydraulic control unit to the limited slip differential to accommodate a corresponding plurality of positions of the differential relative to the axle housing.

14. The hydraulic control unit of claim 11 wherein the hydraulic control unit housing further comprises:
   a hydraulic control unit housing mounting structure having first and second receiving bores that both define a first diameter and wherein a first pair of first fasteners that both define a second diameter, less than the first diameter, couple the hydraulic control unit to an axle housing that houses the limited slip differential.

15. The hydraulic control unit of claim 14, further comprising first and second mounting members that respectively comprise (i) third and fourth receiving bores, and (ii) first and second mounting passages, wherein a second pair of first fasteners respectively extend through the third and fourth receiving bores coupling the hydraulic control unit to the axle housing, wherein the third receiving bore is transverse to the first mounting passage and the fourth receiving bore is transverse to the second mounting passage.

16. The hydraulic control unit of claim 15, further comprising a pair of second fasteners that extend through the first and second mounting passages and mate with the hydraulic control unit housing to couple the first and second mounting members thereat.

17. The hydraulic control unit of claim 11 wherein the hydraulic control unit is pre-filled with hydraulic fluid prior to coupling to the axle housing.

18. The hydraulic control unit of claim 11 wherein the biasing assembly further comprises:
- a first biasing member having a first spring rate;
- a second biasing member having a second spring rate, wherein the first and second spring rates are distinct; and
- a guide rod that supports the first and second biasing members.

19. A hydraulic control unit that delivers hydraulic fluid to a limited slip differential, the hydraulic control unit comprising:
- a hydraulic control unit housing having an accumulator housing portion and a housing manifold portion that collectively house a biasing assembly and a piston, the housing manifold portion forming an accumulator chamber with the piston;
- a sump defined in the hydraulic control unit housing and that at least partially occupies a common space with the accumulator housing portion;
- a pump that pumps fluid into the accumulator chamber of the accumulator housing portion; and
- a hydraulic control unit housing mounting structure having first and second receiving bores that both define a first diameter and wherein a first pair of first fasteners that both define a second diameter, less than the first diameter, couple the hydraulic control unit to an axle housing that houses the limited slip differential, the hydraulic control unit being pre-filled with hydraulic fluid prior to coupling to the axle housing;
- wherein the fluid pumped into the accumulator housing portion at least partially collapses the biasing assembly and introduces a pre-charge into the hydraulic control unit, wherein the biasing assembly is configured to subsequently expand after the pre-charge and urge the piston in a first direction resulting in fluid being communicated from the hydraulic control unit and into the limited slip differential.

20. The hydraulic control unit of claim 19, further comprising a hydraulic coupling that has a first end that is received by a first receiving bore defined on the hydraulic control unit housing.

21. The hydraulic control unit of claim 20 wherein the hydraulic coupling has a second end that is configured to be received by a second receiving bore defined on a hydraulic port associated with the limited slip differential.

22. The hydraulic control unit of claim 21, further comprising at least one o-ring disposed around the second end that sealingly engages the second receiving bore.

23. The hydraulic control unit of claim 22 wherein the hydraulic coupling is configured to extend through a hydraulic coupler receiving bore defined in the axle housing.

* * * * *